(12) United States Patent
Sato et al.

(10) Patent No.: US 6,544,687 B1
(45) Date of Patent: Apr. 8, 2003

(54) NON-AQUEOUS ELECTROLYTE SECONDARY BATTERY

(75) Inventors: Toshitada Sato, Osaka (JP); Hideharu Takezawa, Katano (JP); Yasuhiko Bito, Minamikawachi-gun (JP); Hiromu Matsuda, Kawabe-gun (JP); Yoshinori Toyoguchi, Yao (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/786,450

(22) PCT Filed: Jun. 28, 2000

(86) PCT No.: PCT/JP00/04283

§ 371 (c)(1),
(2), (4) Date: Mar. 1, 2001

(87) PCT Pub. No.: WO01/03210

PCT Pub. Date: Jan. 11, 2001

(30) Foreign Application Priority Data

Jul. 1, 1999 (JP) .............................................. 11-188133

(51) Int. Cl.⁷ ................................................. H01M 4/58
(52) U.S. Cl. ................................ 429/231.1; 429/231.3; 429/218.1; 429/220; 429/221; 429/223; 429/224
(58) Field of Search ................................ 429/220, 221, 429/223, 224, 231.1, 218.1, 231.3

(56) References Cited

U.S. PATENT DOCUMENTS

| 5,294,503 A | 3/1994 | Huang et al. ............. 252/182.1 |
| 5,426,005 A | 6/1995 | Eschbach ..................... 252/62.2 |
| 6,235,427 B1 * | 5/2001 | Idota et al. ................. 29/623.1 |
| 6,265,111 B1 * | 7/2001 | Bito et al. ................ 429/218.1 |

FOREIGN PATENT DOCUMENTS

| JP | 07122274 A | 5/1995 |
| JP | 07235293 A | 9/1995 |
| JP | 07288123 A | 10/1995 |
| JP | 10223221 A | 8/1998 |
| JP | 11007979 A | 1/1999 |
| JP | 11329430 A | 11/1999 |
| WO | WO 95/22846 | 8/1995 |

* cited by examiner

*Primary Examiner*—Laura Weiner
(74) *Attorney, Agent, or Firm*—Akin Gump Strauss Hauer & Feld, L.L.P.

(57) ABSTRACT

A solid solution represented by the formula (1): $Li_xM^1{}_yM^2{}_z$ is used as a negative electrode active material for a non-aqueous electrolyte secondary battery comprising a chargeable and dischargeable positive electrode, a non-aqueous electrolyte and a chargeable and dischargeable negative electrode. In the formula (1), $M^1$ represents at least one element selected from the group consisting of Ti, Zr, Mn, Co, Ni, Cu and Fe, and $M^2$ represents at least one element selected from the group consisting of Si and Sn, and $0 \leq x < 10$, $0.1 \leq y \leq 10$ and $z=1$.

7 Claims, 4 Drawing Sheets

NON-AQUEOUS ELECTROLYTE SECONDARY BATTERY

CROSS-REFERENCE TO RELATED APPLICATION

This application is a continuation of Internaional Application No. PCT/JP00/04283, filed Jun. 28, 2000, the disclosure of which is incorporated herein by reference.

TECHNICAL FIELD

The present invention relates to a non-aqueous electrolyte secondary battery. More particularly, the present invention relates to a non-aqueous electrolyte secondary battery having a highly reliable negative electrode with a high electric capacity and with the growth of dendrite suppressed.

BACKGROUND ART

High voltage and high energy density can be expected from non-aqueous electrolyte secondary batteries using lithium or a lithium compound in the negative electrode. Positive electrode active materials for non-aqueous electrolyte secondary batteries that have been known include oxides and chalcogens of transition metals such as $LiMn_2O_4$, $LiCoO_2$, $LiNiO_2$, $V_2O_5$, $Cr_2O_5$, $MnO_2$, $TiS_2$ and $MoS_2$. Those compounds have a layered or tunneled crystal structure that allows intercalation and deintercalation of lithium ions. As to the negative electrode active material, on the other hand, there are many previous studies on metallic lithium. However, the use of metallic lithium causes dendrite to deposit on the surface of lithium during charging, which reduces charge/discharge efficiency. In addition, internal short-circuit is caused if dendrites come in contact with the positive electrode.

As a solution to those problems, the use of a lithium alloy such as lithium-aluminum alloy, which not only suppresses the growth of dendrite but also can absorb lithium therein and desorb it therefrom in the negative electrode, has been studied. However, in case the lithium alloy is used, the repeating of deep charging and discharging causes pulverization of the electrode, presenting a problem concerning the cycle life characteristics.

In recent years, a highly safe carbon material capable of reversibly absorbing and desorbing lithium and excellent in cycle life characteristics has been used in the negative electrode, although smaller in capacity than metallic lithium or lithium alloy. In an attempt to further increase the capacity of the non-aqueous electrolyte secondary battery, studies have been made about application of oxides to the negative electrode. For example, it is suggested in Japanese Laid-Open Patent Publications Hei 7-122274 and Hei 7-235293 that crystalline SnO and $SnO_2$ may serve as negative electrode materials having high capacities than the conventional oxide $WO_2$. It is also proposed in Japanese Laid-Open Patent Publication Hei 7-288123 that non-crystalline oxide such as $SnSiO_3$ or $SnSi_{1-x}P_xO_3$ is used in the negative electrode in order to improve the cycle life characteristics of the battery. However, no sufficient characteristics have been obtained yet.

In view of the circumstance described above, it is the object of the present invention to provide a non-aqueous electrolyte secondary battery having a high capacity and excellent charge/discharge cycle life characteristics in which no dendrite grows because the negative electrode absorbs lithium upon charging.

DISCLOSURE OF INVENTION

The present invention relates to a non-aqueous electrolyte secondary battery comprising a chargeable and dischargeable positive electrode, a non-aqueous electrolyte and a chargeable and dischargeable negative electrode, wherein the negative electrode has a solid solution, as an active material, the solid solution being represented by the formula (1):

$$Li_xM^1_yM^2_z \qquad (1)$$

wherein $M^1$ represents at least one element selected from the group consisting of Ti, Zr, Mn, Co, Ni, Cu and Fe, and $M^2$ represents at least one element selected from the group consisting of Si and Sn, and wherein $0 \leq x < 10$, $0.1 \leq y \leq 10$ and $z=1$.

The average particle size of the solid solution represented by the formula (1) is preferably 0.5 to 2.3 $\mu$m. And the average crystal grain size of the solid solution represented by the formula (1) is preferably 0.05 to 0.13 $\mu$m.

The above-mentioned negative electrode contains preferably 5 to 50 parts by weight of carbon material per 100 parts by weight of the solid solution represented by the formula (1).

BEST MODE FOR CARRING OUT THE INVENTION

Figure 1:
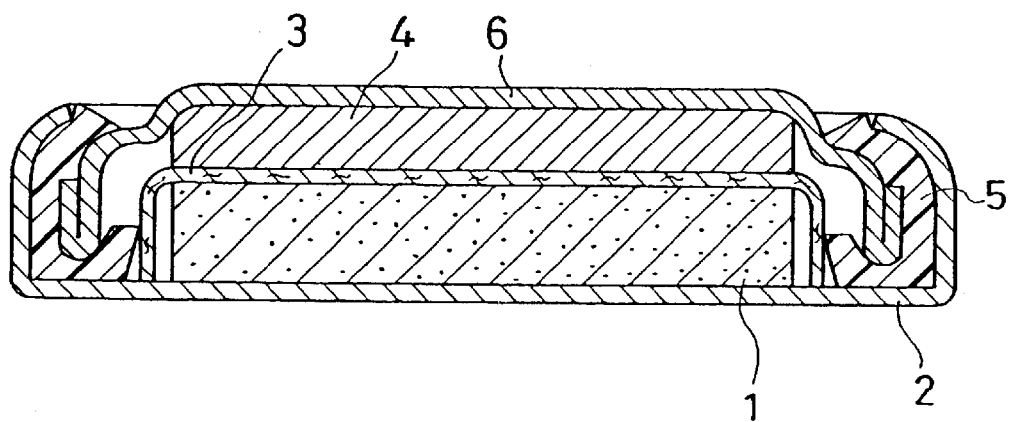
FIG. 1 is a cross-sectional view of a test cell used for evaluating the electrode characteristics of a negative electrode used in a non-aqueous electrolyte secondary battery of the present invention.

The present invention relates to a non-aqueous electrolyte secondary battery having a chargeable and dischargeable positive electrode, a non-aqueous electrolyte comprising a non-aqueous solvent containing lithium salt dissolved therein and a chargeable and dischargeable negative electrode, wherein the negative electrode contains, as an active material, an alloy represented by the formula (1): $Li_xM^1_yM^2_z$. This alloy is a solid solution in which $M^2$ is dissolved in the crystal structure of $M^1$, or $M^1$ is dissolved in the crystal structure of $M^2$.

$M^1$ in the formula (1) is at least one element selected from the group consisting of Ti, Zr, Mn, Co, Ni, Cu and Fe. That is, $M^1$ may be a combination of two or more elements. In view of the structural stability of the solid solution, however, it is desirable to use one of them alone.

As to $M^2$ in the formula (1), at least one element selected from the group consisting of Si and Sn is used, because excellent charge/discharge characteristics can be obtained therefrom in the battery.

Herein, $0 \leq x < 10$, and to suppress dendrite effectively, it is desirable that $0 \leq x < 5$.

And $0.1 \leq y \leq 10$. When y is less than 0.1, the structure of the solid solution is unstable and the solid solution used as an active material deteriorates in the charge/discharge reaction. When y is more than 10, on the other hand, the battery capacity is decreased.

And z=1. It is noted that the value of x changes with absorbing or desorbing Li in the charge/discharge reaction of the battery. Immediately after a battery is fabricated, x is generally 0.

It is desirable that the crystal grain of the solid solution is 0.05 to 0.13 $\mu$m in average grain size. Because when the grain size is small like that, many grain boundaries are formed in the solid solution. And the grain boundaries function to suppress the expansion of the solid solution down to a minimum when lithium is absorbed therein.

It is also noted that the smaller the particle size of the solid solution as the active material is, the larger the specific surface area is and the more improved the efficiency of battery reaction is. But when the particle size is too small, there arise such problems as difficulty in handling and side reaction between the electrolyte and the solid solution, and therefore it is desirable that the average particle size of the solid solution is 0.5 to 2.3 $\mu$m.

Furthermore, it is desirable that the negative electrode contains such carbon materials as graphite, low-crystalline carbon materials and acetylene black, and the content thereof is preferably 5 to 50 parts by weight per 100 parts by weight of the solid solution. When the solid solution and the carbon material are mixed and used in the negative electrode, the retention of electrolyte in the negative electrode is improved and the charge/discharge cycle life characteristics is also improved. However, too much carbon material would make it difficult to get the most of the feature that the active material has a high energy density, and to increase the capacity of the battery.

The solid solution can be synthesized by any of the following exemplary processes: mechanical alloying, liquid quenching, ion beam sputtering, vacuum evaporation, plating and chemical vapor deposition (CVD). Among them, the solid solution used in the present invention can be produced easily by the liquid quenching process or mechanical alloying process in particular. In the liquid quenching process, for example, the molten raw material can be quenched by a single roll at a rate of $10^5$ to $10^6$ K/second, and a solid solution having a micro crystal grain can be obtained. The mechanical alloying process also can produce a micro crystal grain and a phase of solid solution that can not be obtained by the conventional thermal technique.

The solid solutions represented by the formula (1) include, for example, $FeSn_2$, $FeSn$, $Fe_2Sn$, $Fe_3Sn$, $CuSn$, $Cu_2Sn$, $Cu_3Sn$, $Cu_6Sn_5$, $TiSn$, $Ti_2Sn$, $Ti_3Sn$, $ZrSn$, $Zr_2Sn$, $MnSn$, $MnSn_2$, $Mn_2Sn$, $Mn_3Sn$, $CoSn$, $CoSn_2$, $Co_2Sn$, $Co_3Sn$, $NiSn$, $NiSn_2$, $Ni_2Sn$, $Ni_3Sn$, $FeSi$, $Fe_2Si$, $Fe_{2.5}Si$, $Fe_{2.3}Si$, $Fe_3Si$, $CuSi$, $Cu_2Si$, $Cu_3Si$, $TiSi$, $TiSi_2$, $Ti_2Si$, $Ti_3Si$, $ZrSi$, $Zr_2Si$, $MnSi$, $MnSi_2$, $Mn_2Si$, $Mn_3Si$, $CoSi$, $Co_2Si$, $Co_3Si$, $NiSi$, $NiSi_2$ and $Ni_2Si$.

In the phase where $M^2$ is dissolved in the crystal structure of $M^1$, or $M^1$ is dissolved in the crystal structure of $M^2$, $M^1$ surrounding $M^2$ is firmly bonded to $M^2$, or $M^2$ surrounding $M^1$ is firmly bonded to $M^1$. Therefore, it is considered that such a solid solution can form a Li—$M^2$ alloy having a very small crystal grain by absorbing lithium. In a negative electrode using the solid solution as an active material, therefore, the growth of dendrite is suppressed, and furthermore, active $M^2$ is not isolated and does not float with ease, thus maintaining the crystal structure and effectively improving the cycle life characteristics of the negative electrode.

The negative electrode that is used in the non-aqueous electrolyte secondary battery of the present. invention is prepared in the following way, for example. First, 5 to 50 parts by weight of carbon material with 100 parts by weight of the solid solution represented by the formula (1), an appropriate quantity of a binder and an appropriate quantity of an electrolyte or a solvent are mixed. And the mixture is molded into a specific form. The carbon material used here is graphite, acetylene black or low-crystalline carbon material, for example. As to the binder, poly(vinylidene fluoride), SBR (stylene-butadiene copolymer rubber), polyethylene, polytetrafluoroethylene or the like is preferably used.

The non-aqueous electrolyte secondary battery of the present invention can be fabricated in the same way as conventional batteries except that the aforementioned negative electrode is used. Therefore, it is possible to use chargeable and dischargeable positive electrodes and non-aqueous electrolytes that have been used in the conventional non-aqueous electrolyte secondary batteries can be used with no particular restriction.

In the following, the present invention will be described more concretely on the basis of examples. But the present invention is not limited thereto.

Figure 2:
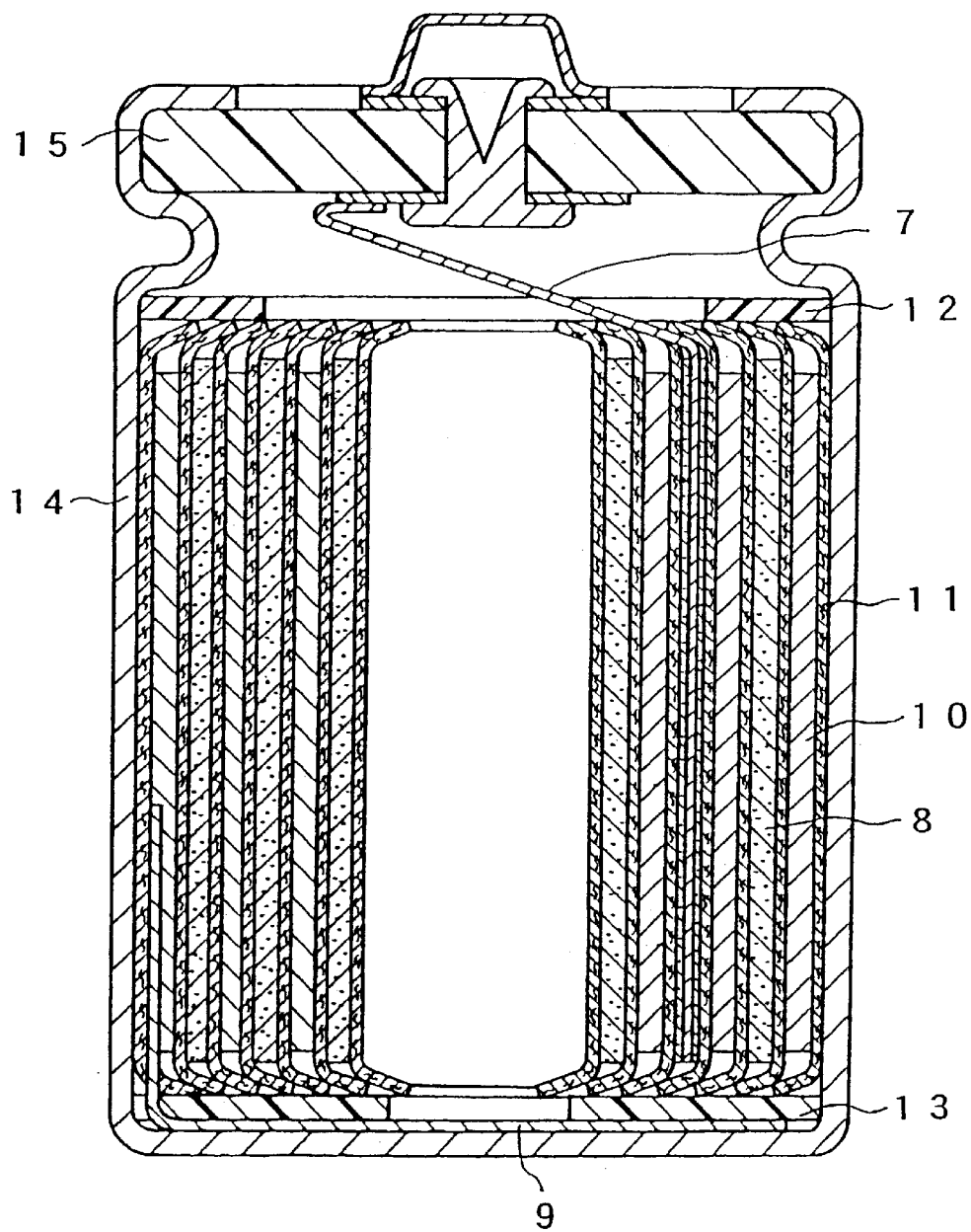
FIG. 2 is a cross-sectional view of a cylindrical battery as an example of the non-aqueous electrolyte secondary battery of the present invention.

First, there will be described the test cell shown in FIG. 1 and the cylindrical battery shown in FIG. 2 used in the examples and comparative examples given below. The test cell was used for evaluation of the electrode characteristics of the negative electrode in which the solid solution in accordance with the present invention is used as the active material. The cylindrical battery was used for evaluation of the cycle life characteristics of the battery with a negative electrode in which the solid solution in accordance with the present invention is used as the active material.

Test Cell

A mixture was prepared by mixing 8.5 g of a negative electrode active material (solid solution), 1 g of graphite powder as a conductive agent and 0.5 g of polyethylene powder as a binder. Then, 0.1 g of the mixture was pressure-molded into a disk with a diameter of 17.5 mm to obtain a test electrode 1. Then, the test electrode 1 was placed in a case 2 as shown in FIG. 1. And a separator 3 made of microporous polypropylene was placed thereon. Then, the non-aqueous electrolyte was filled into case 2. The electrolyte used here was prepared by dissolving 1 mol/l of lithium perchlorate ($LiClO_4$) in a mixed solvent of ethylene carbonate and dimethoxyethane in an equivolumetric ratio. And the case 2 was sealed with a sealing plate 6 having a metallic lithium 4 in the form of a disk with a diameter of 17.5 mm attached inside thereof, and a polypropylene gasket 5 on the periphery thereof to complete a test cell.

Cylindrical Battery

The negative electrode active material (solid solution), graphite powder as a conductive agent and polytetrafluoroethylene as a binder were mixed in a ratio of 60:3:10 by weight. Then, to this mixture, a petroleum type solvent was added and a paste was obtained. The paste thus obtained was applied on a copper core and dried at 100° C. to produce a negative electrode plate.

Meanwhile, the positive electrode active material $LiMn_{1.8}Co_{0.2}O_4$ was synthesized by mixing $Li_2CO_3$, $Mn_3O_4$ and $CoCO_3$ in a predetermined molar ratio, followed by heating at 900° C. Of the active material thus obtained, particles not larger than 100 mesh in size were sieved out. Then, 100 g of the positive electrode active material, 10 g of graphite as a conductive agent and 8 g (resin content) of aqueous dispersion of polytetrafluoroethylene as a binder were mixed. To this mixture, pure water was added to obtain a paste. The paste thus obtained was applied on a titanium core, followed by drying and rolling, to produce a positive electrode plate.

Using the positive electrode and negative electrode thus obtained, a cylindrical battery was assembled in the following way. Between a positive electrode plate 8 having a spot-welded positive electrode lead 7 made of the same material as that of the core and a negative electrode plate 10 having a spot-welded negative electrode lead 9 made of the same material as that of the core, a band-like separator 11 made of a porous polypropylene wider than the two electrode plates was placed. And the whole was wound up into an electrode group. Then, the electrode group was inserted into a battery case 14, with a polypropylene insulating plate 12 and 13 placed at the top and bottom of the electrode group, respectively. After a step was formed at the upper part of the battery case 14, a non-aqueous electrolyte prepared by dissolving 1 mol/l of lithium perchlorate ($LiClO_4$) in a mixed solvent of ethylene carbonate and dimethoxyethane in an equivolumetric ratio was injected into the battery case 14. Then, the opening of the battery case 14 was sealed using a sealing plate 15.

EXAMPLES 1 to 45

Solid solutions having compositions represented by the formula (1), where $M^2$ is dissolved in the crystal structure of $M^1$, or $M^1$ is dissolved in the crystal structure of $M^2$, were prepared in the procedure as mentioned below. And using these as negative electrode active material, the above-mentioned test cells and cylindrical batteries were fabricated and evaluated.

First, solid solutions having compositions shown in Table 1 were prepared. The raw materials $M^1$ and $M^2$ were selected with one element for each of them, and mixed in a predetermined molar ratio. Then, the mixture was placed in a pot mill made of stainless steel with an internal volume of 0.5 liters having 20 stainless steel balls (½ inch in diameter) accommodated therein, and the mill was sealed in an argon atmosphere. This mill was rotated at 60 rpm for one week to obtain an intended solid solution. The solid solutions thus obtained were all between 0.5 and 2.3 μm in average particle size. And the average crystal grain size of any of the solid solutions calculated from an X-ray diffraction pattern was between 0.05 and 0.13 μm.

Figure 3:
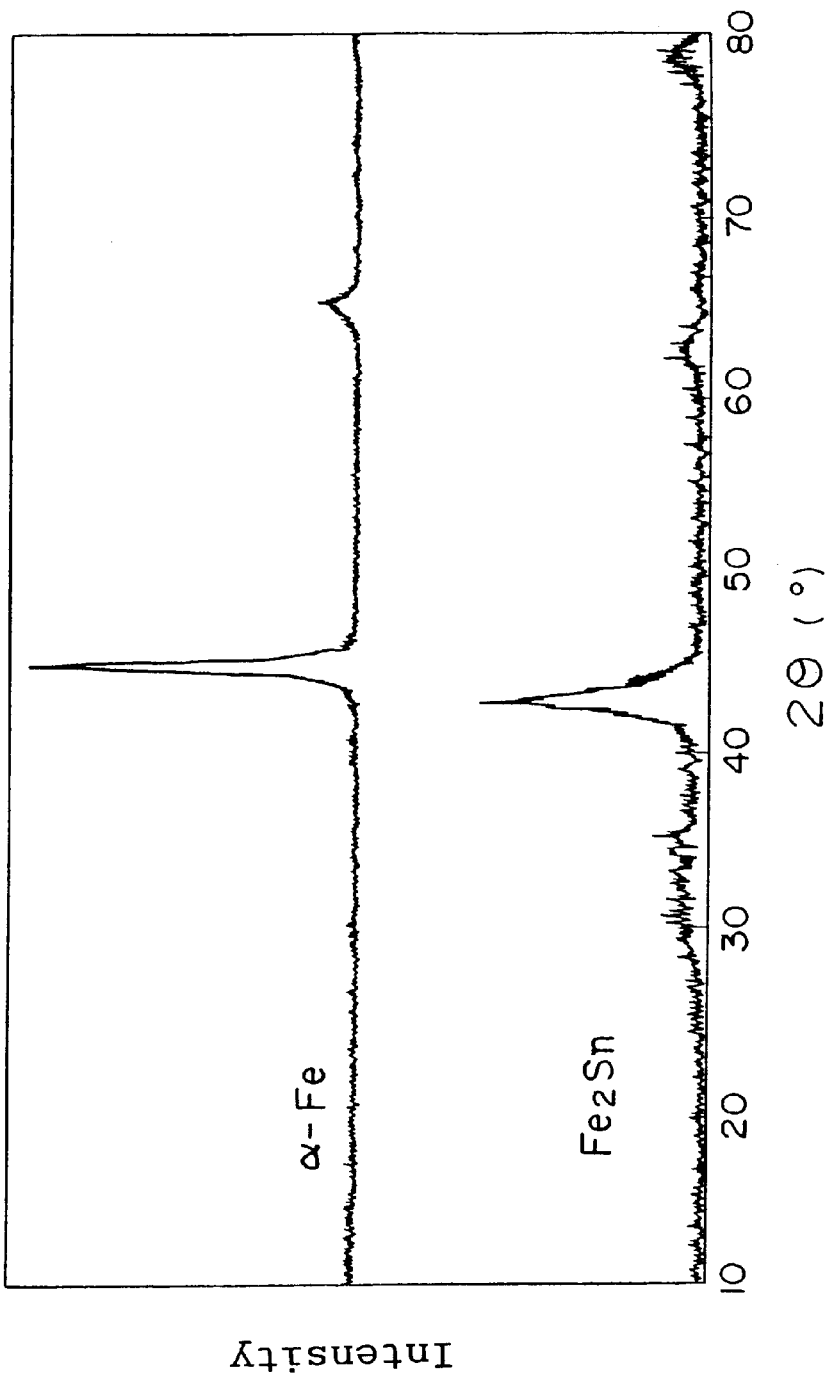
FIG. 3 depicts X-ray diffraction patterns of the powder of $Fe_2Sn$ as an example of the solid solution in accordance with the present invention, and the powder of $\alpha$-Fe.

Among the obtained solid solutions, the X-ray diffraction pattern of $Fe_2Sn$ is shown in FIG. 3. FIG. 3 shows that $Fe_2Sn$ has a single solid solution phase and that no peak attributable to Fe and Sn is present. In FIG. 3, no peak attributable to a Fe—Sn type intermetallic compound is observed, either. It was found, from a detailed analysis of peak shift in the X-ray diffraction pattern, that in this solid solution, Sn atoms were infiltrated in the crystal structure of Fe, which is a body-centered cubic (bcc) structure, but that the bcc structure was maintained. If it is supposed that all the Sn atoms in $Fe_2Sn$ are infiltrated into the crystal structure of Fe and that the bcc structure is maintained, the position of a peak attributable to its (100) crystal face is calculated at 43°. This value agrees with the actual measurement obtained from FIG. 3. This also indicates that $Fe_2Sn$ in the example is a solid solution where Sn is infiltrated into the crystal structure of Fe. It was also confirmed that the solid solution in any of the other examples is a solid solution where $M^2$ is dissolved in $M^1$, or $M^1$ is dissolved in $M^2$.

Then, using the above-mentioned solid solutions in the test electrode, test cells were fabricated. Then at a constant current of 2 mA, the test cell was subjected to cathode polarization (corresponding to charging when the test electrode was seen as a negative electrode) until the electric potential of the test electrode became 0 volt against the counter electrode of metallic lithium. Then, the test cell was subjected to anode polarization (corresponding to discharging when the test electrode was seen as a negative electrode) until the electric potential of the test electrode became 1.5 volts against the counter electrode of metallic lithium. After that, cathode polarization and anode polarization were repeated. The first discharge capacity per 1 g of active material of the test electrode is shown in Table 1.

After the cathode polarization, and after the cathode polarization and anode polarization were repeated 10 times, respectively, all the test cells were disassembled and the test electrodes were taken out and observed. No deposition of metallic lithium was observed on the surface of any of the electrodes. From this, it is shown that it is difficult for dendrite to grow on the surface of the electrode in which the solid solution of the example is used as the active material. Furthermore, when the test electrodes were put to elemental quantitative analysis after the cathode polarization, the quantity of lithium contained in the active material was within the range of x ($0 \leq x < 10$) in the formula (1) in any of the test electrodes.

Next, cylindrical batteries were fabricated using the above-mentioned solid solutions in the negative electrodes. And the batteries thus obtained were subjected to the repetition of a charge/discharge cycle at 30° C. Then, the capacity maintenance rates at the 100th cycle to that at the first cycle were worked out. In this test, the charge/discharge current was 1 $mA/cm^2$, and the charge/discharge voltage was between 2.6 and 4.3 volts. The results are shown in Table 1.

TABLE 1

| Example No. | Composition | Discharge Capacity (mAh/g) | Capacity Maintenance rate (%) |
|---|---|---|---|
| 1 | FeSn | 670 | 94 |
| 2 | $FeSn_2$ | 920 | 91 |
| 3 | $Fe_2Sn$ | 530 | 97 |
| 4 | $Fe_3Sn$ | 410 | 99 |
| 5 | CuSn | 520 | 94 |
| 6 | $Cu_2Sn$ | 460 | 96 |
| 7 | $Cu_3Sn$ | 350 | 99 |
| 8 | TiSn | 500 | 96 |
| 9 | $Ti_2Sn$ | 420 | 97 |
| 10 | $Ti_3Sn$ | 370 | 99 |
| 11 | ZrSn | 480 | 98 |
| 12 | $Zr_2Sn$ | 400 | 98 |
| 13 | MnSn | 490 | 92 |
| 14 | $MnSn_2$ | 620 | 85 |
| 15 | $Mn_2Sn$ | 400 | 99 |
| 16 | $Mn_3Sn$ | 360 | 100 |
| 17 | CoSn | 570 | 91 |
| 18 | $Co_2Sn$ | 490 | 95 |
| 19 | $Co_3Sn$ | 400 | 99 |
| 20 | NiSn | 540 | 92 |
| 21 | $Ni_2Sn$ | 460 | 95 |
| 22 | $Ni_3Sn$ | 390 | 99 |
| 23 | FeSi | 520 | 94 |
| 24 | $Fe_2Si$ | 460 | 96 |
| 25 | $Fe_{2.5}Si$ | 350 | 99 |
| 26 | $Fe_{2.3}Si$ | 500 | 96 |
| 27 | $Fe_3Si$ | 420 | 97 |
| 28 | CuSi | 370 | 99 |
| 29 | $Cu_2Si$ | 480 | 98 |
| 30 | $Cu_3Si$ | 400 | 98 |
| 31 | TiSi | 350 | 94 |
| 32 | $Ti_2Si$ | 360 | 92 |
| 33 | $Ti_3Si$ | 580 | 94 |
| 34 | ZrSi | 520 | 93 |
| 35 | $Zr_2Si$ | 410 | 95 |
| 36 | MnSi | 590 | 92 |
| 37 | $MnSi_2$ | 460 | 93 |
| 38 | $Mn_2Si$ | 570 | 91 |
| 39 | $Mn_3Si$ | 490 | 95 |
| 40 | CoSi | 540 | 92 |
| 41 | $Co_2Si$ | 460 | 95 |
| 42 | $Co_3Si$ | 390 | 99 |
| 43 | NiSi | 400 | 99 |
| 44 | $NiSi_2$ | 580 | 100 |
| 45 | $Ni_2Si$ | 470 | 95 |

Comparative Examples 1 to 4

The same procedure as in the preceding examples was followed except that the previously reported Fe-Sn type intermetallic compound (J. R. Dahn et al., Journal of Electrochemical Society, 146 (2), 414–422 (1999)) was used, and the evaluation was also conducted in the same manner.

As the Fe—Sn type intermetallic compounds, $FeSn_2$, $FeSn$, $Fe_3Sn_2$ and $Fe_5Sn_3$ shown in Table 2 were used. Those intermetallic compounds were prepared using the high-speed ball mill as mentioned in the previous report, followed by heat treatment. The evaluation results are shown in Table 2.

The intermetallic compounds in the above-mentioned comparative examples were all between 1.8 and 26 $\mu$m in average particle size. It is believed that the primary particles are aggregated in the heat treatment. Also, because of the heat treatment, any of the intermetallic compounds in all the comparative examples had a large average grain size of 0.37 to 1.9 $\mu$m.

TABLE 2

| Comparative Example No. | Composition | Discharge Capacity (mAh/g) | Capacity Maintenance rate (%) |
|---|---|---|---|
| 1 | $FeSn_2$ | 800 | 1 |
| 2 | $FeSn$ | 250 | 3 |
| 3 | $Fe_3Sn_2$ | 150 | 4 |
| 4 | $Fe_5Sn_3$ | 100 | 5 |

The results in Table 1 and Table 2 show that the batteries of the examples in which the above-mentioned solid solutions were used in the negative electrodes are high in capacity and capacity maintenance rate and excellent in cycle life characteristics. In comparison, many of the batteries of the comparative examples are very low in capacity maintenance rate and insufficient in capacity.

Figure 4:
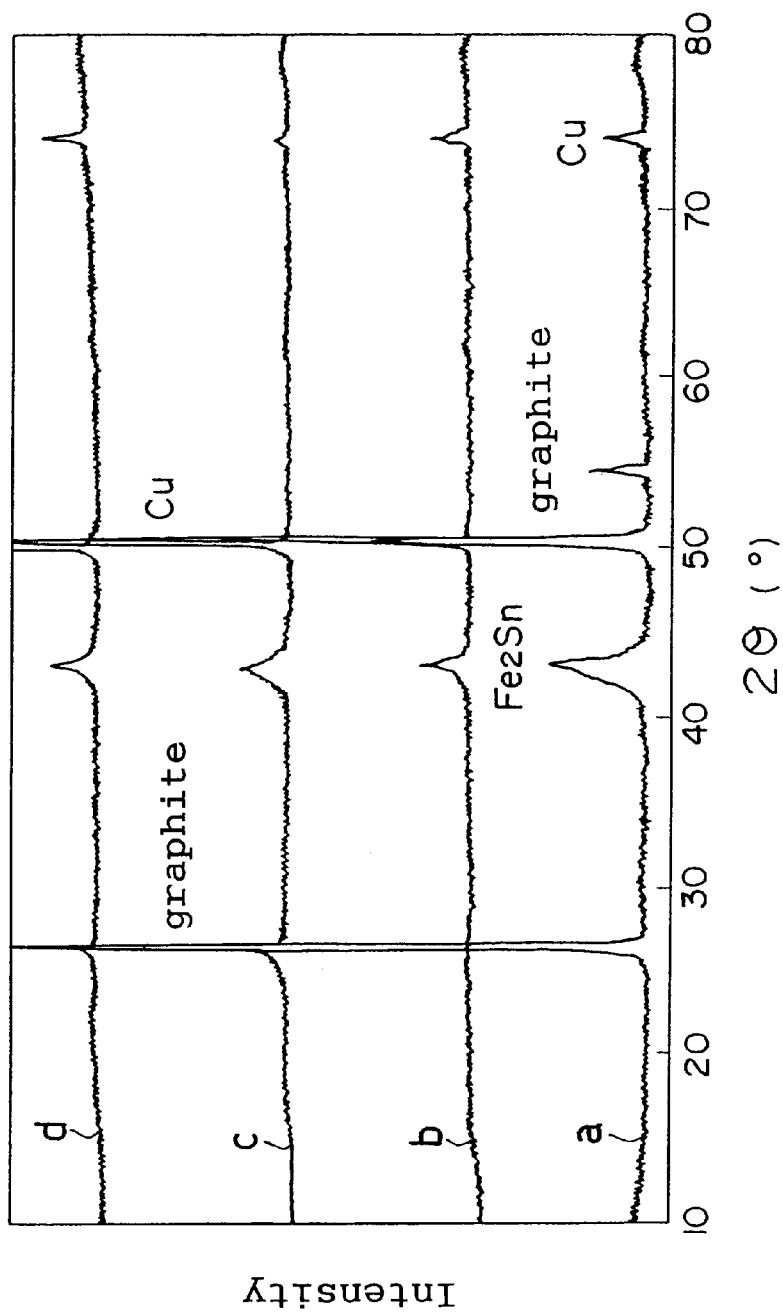
FIG. 4 depicts X-ray diffraction patterns of negative electrodes, in which $Fe_2Sn$ as an example of the solid solution in accordance with the present invention is used as an active material, in the initial state (a), in the first charged state (b), in the first discharged state (c) and in the discharged state after 500 cycles (d).

In FIG. 4, there are shown X-ray diffraction patterns of the negative electrodes, in which a solid solution having a composition of $Fe_2Sn$ is used as an active material, in the initial state (a), in the first charged state (b), in the first discharged state (c) and in the discharged state after 500 cycles (d). FIG. 4 shows that the repetition of charge/discharge reactions does not cause any shift of the peak attributable to the crystal structure of the solid solution. In any diffraction pattern in FIG. 4, no peak is found that indicates the formation of a Li—Sn alloy. As a reason why the solid solutions in the examples are high incapacity and excellent in cycle life characteristics like described above, it can be pointed out that even after the charging and discharging are repeated, the solid solutions maintain their initial crystal structures.

In the foregoing examples, the cylindrical batteries have been described, but the effect of the present invention is the same when coin type, rectangular type, or flat type battery is assembled. In the foregoing examples, the solid solutions were prepared by the mechanical alloying process, but the same effects can be obtained if the solid solutions are prepared by the liquid quenching, ion beam sputtering, vacuum evaporation, plating or CVD process. It is also noted that in the forgoing examples, $LiMn_{1.8}Co_{0.2}O_4$ was used in the positive electrodes, but the same effects can be obtained with $LiMn_2O_4$, $LiCoO_2$, $LiNiO_2$ or the like.

Industrial Applicability

As described above, according to the present invention, a highly-reliable non-aqueous electrolyte secondary battery with a high energy density and free from dendrite-induced short-circuit can be obtained because a negative electrode high in capacity and excellent in cycle life characteristics is used.

What is claimed is:

1. A non-aqueous electrolyte secondary battery comprising a chargeable and dischargeable positive electrode, a non-aqueous electrolyte, and a chargeable and dischargeable negative electrode, the negative electrode including, as an active material, a solid solution represented by formula (1):

$$Li_x M^1_y M^2_z \quad (1)$$

wherein $M^1$ represents at least one element selected from the group consisting of Ti, Zr, Mn, Co, Ni, Cu and Fe, $M^2$ represents at least one element selected from the group consisting of Si and Sn, $0 \leq x < 10$, $0.1 \leq y \leq 10$, and $z=1$, and wherein the solid solution represented by formula (1) has an average crystal grain size of 0.05 to 0.13 $\mu$m.

2. The non-aqueous electrolyte secondary battery in accordance with claim 1, wherein said solid solution represented by the formula (1) has an average particle size of 0.5 to 2.3 $\mu$m.

3. The non-aqueous electrolyte secondary battery in accordance with claim 1, wherein said negative electrode contains 5 to 50 parts by weight of carbon material per 100 parts by weight of said solid solution represented by the formula (1).

4. A non-aqueous electrolyte secondary battery comprising a chargeable and dischargeable positive electrode, a non-aqueous electrolyte, and a chargeable and dischargeable negative electrode, said negative electrode including, as an active material, a solid solution represented by the formula (1):

$$Li_x M^1_y Sn_z \quad (1)$$

wherein $M^1$ represents at least one element selected from the group consisting of Ti, Zr, Mn, Co, Ni, Cu and Fe, $0 \leq x < 10$, $0.1 \leq y \leq 10$, and $z=1$.

5. The non-aqueous electrolyte secondary battery in accordance with claim 4, wherein the solid solution represented by formula (1) has an average particle size of 0.5 to to 2.3 $\mu$m.

6. The non-aqueous electrolyte secondary battery in accordance with claim 4, wherein the solid solution represented by formula (1) has an average crystal grain size of 0.05 to 0.13 $\mu$m.

7. The non-aqueous electrolyte secondary battery in accordance with claim 4, wherein the negative electrode contains 5 to 50 parts by weight of carbon material per 100 parts by weight of the solid solution represented by formula (1).

* * * * *